(12) United States Patent
Yae

(10) Patent No.: US 11,782,973 B2
(45) Date of Patent: Oct. 10, 2023

(54) SYSTEM AND METHOD FOR SHARING ACCIDENT INFORMATION OF VEHICLE

(71) Applicants: Hyundai Motor Company, Seoul (KR); Kia Corporation, Seoul (KR)

(72) Inventor: Seong Soo Yae, Hwasong-Si (KR)

(73) Assignees: Hyundai Motor Corporation, Seoul (KR); Kia Corporation, Seoul (KR)

(*) Notice: Subject to any disclaimer, the term of this patent is extended or adjusted under 35 U.S.C. 154(b) by 253 days.

(21) Appl. No.: 17/237,991

(22) Filed: Apr. 22, 2021

(65) Prior Publication Data

US 2022/0075816 A1    Mar. 10, 2022

(30) Foreign Application Priority Data

Sep. 8, 2020   (KR) .................. 10-2020-0114825

(51) Int. Cl.
*G06F 16/587* (2019.01)
*G06F 16/535* (2019.01)
*G07C 5/00* (2006.01)
*G06T 7/00* (2017.01)
*G06V 20/56* (2022.01)
*G07C 5/08* (2006.01)
*G06V 20/62* (2022.01)

(52) U.S. Cl.
CPC .......... *G06F 16/587* (2019.01); *G06F 16/535* (2019.01); *G06T 7/0004* (2013.01); *G06V 20/56* (2022.01); *G07C 5/008* (2013.01); *G07C 5/0816* (2013.01); *G06T 2207/30252* (2013.01); *G06V 20/625* (2022.01)

(58) Field of Classification Search
None
See application file for complete search history.

(56) References Cited

U.S. PATENT DOCUMENTS

2014/0324247 A1* 10/2014 Jun .................. G07C 5/0866
                                                                701/1

* cited by examiner

*Primary Examiner* — Thomas S McCormack
(74) *Attorney, Agent, or Firm* — MORGAN, LEWIS & BOCKIUS LLP

(57) ABSTRACT

A system for sharing accident information related to a vehicle and a method thereof, may include an accident vehicle that collects accident information and requests an accident image including the accident information, and a server that determines whether the accident image and a request for the accident image are received from the accident vehicle, identifies a reporting vehicle capable of providing a reporting image corresponding to the accident information and the accident image when the accident information and the request for the accident image are received, and requests the reporting vehicle to transmit the reporting image acquired by the reporting vehicle to the accident vehicle. When a vehicle accident occurs, the cause of the accident may be more accurately determined by sharing the surrounding image with vehicles driving around the accident vehicle.

18 Claims, 11 Drawing Sheets

SYSTEM AND METHOD FOR SHARING ACCIDENT INFORMATION OF VEHICLE

CROSS-REFERENCE TO RELATED APPLICATION

The present application claims priority to Korean Patent Application No. 10-2020-0114825, filed on Sep. 8, 2020, the entire contents of which is incorporated herein for all purposes by this reference.

BACKGROUND OF THE INVENTION

Field of the Invention

The present invention relates to a system and a method for sharing accident information.

Description of Related Art

In general, when a vehicle accident occurs, a surrounding image obtained from a camera mounted on the vehicle is used to determine the cause of the vehicle accident. In particular, in order to more accurately determine the cause of the accident, not only the surrounding image of the accident vehicle but also the surrounding image of the vehicle driving around the accident vehicle may be used.

However, it is difficult for the occupant of an accident vehicle to request the surrounding image because the occupant cannot remember the vehicle driving around the accident vehicle at the time of the accident. Therefore, there is a need to develop a technology capable of sharing surrounding images with vehicles driving around the accident vehicle when an accident occurs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for sharing accident information which is capable of sharing a surrounding image with vehicles driving around an accident vehicle when a vehicle accident occurs, and a method thereof.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a system for sharing accident information related to a vehicle may include an accident vehicle that collects the accident information and requests an accident image including the accident information, and a server that determines whether the accident image and a request for the accident image are received from the accident vehicle, identifies a reporting vehicle capable of providing a reporting image corresponding to the accident information and the accident image when the accident information and the request for the accident image are received, and requests the reporting vehicle to transmit the reporting image acquired by the reporting vehicle to the accident vehicle.

The accident vehicle may collect the accident information including location information related to an accident occurrence point, a search radius based on the accident occurrence point, information related to a road where an accident occurs, and neighboring road information, and heading information.

The accident vehicle is configured to extract a search factor for acquiring information related to the reporting image based on the accident information.

The search factor may include license plate number, a vehicle type, a vehicle color, an accident occurrence location, accident occurrence time, and heading information.

The server may store a history of providing the reporting image when the reporting image is provided from the reporting vehicle.

The server may determine whether information related to the reporting vehicle is identified based on the search factor or the history of providing the reporting image.

The server may transmit information related to the accident vehicle to the reporting vehicle when information related to the reporting vehicle is identified.

The server may request the reporting image corresponding to the accident image from a vehicle subscribed to an accident information sharing service when information related to the reporting vehicle is not identified.

The server may store information related to the reporting image provided from the reporting vehicle and determine whether an accident vehicle requesting the accident image exists even when the accident information and the request for the accident image are not received from the accident vehicle.

The server may identify information related to the accident vehicle and transmits the information related to the accident vehicle to the reporting vehicle when the accident vehicle requesting the accident image exists.

The server may notify the reporting vehicle that any vehicles requesting the accident image do not exist and requests the reporting vehicle to store the accident image when any accident vehicles requesting the accident image do not exist.

The reporting vehicle may transmit the reporting image to the accident vehicle or a user portable terminal of the accident vehicle when receiving information related to the accident vehicle from the server.

The reporting vehicle may extract a search factor when acquiring the reporting image.

According to various aspects of the present invention, a method of sharing accident information may include collecting, by an accident vehicle, accident information and requesting an accident image including the accident information from a server; determining whether the accident information and the request for the accident image are received, and identifying a reporting vehicle capable of providing a reporting image corresponding to the accident information and the accident image when the accident information and the request for the accident image are received; and requesting the reporting vehicle to transmit the reporting image obtained by the reporting vehicle to the accident vehicle.

The method may further include transmitting information related to the accident vehicle to the reporting vehicle when information related to the reporting vehicle is identified.

The method may further include requesting, by a server, the reporting image corresponding to the accident image from a vehicle subscribed to an accident information sharing service when information related to the reporting vehicle is not identified.

The method may further include storing, by a server, information related to the reporting image provided from the reporting vehicle and determining whether an accident vehicle requesting the accident image exists even when the accident information and the request for the accident image are not received from the accident vehicle.

The server may identify information related to the accident vehicle and transmit the information related to the accident vehicle to the reporting vehicle when the accident vehicle requesting the accident image exists.

The method may further include notifying, by the server, the reporting vehicle that any vehicles requesting the accident image do not exist, and requesting the reporting vehicle to store the reporting image when any vehicles requesting the accident image do not exist.

The method may further include transmitting the reporting image to the accident vehicle or a user portable terminal of the accident vehicle when information related to the accident vehicle is received from the server.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
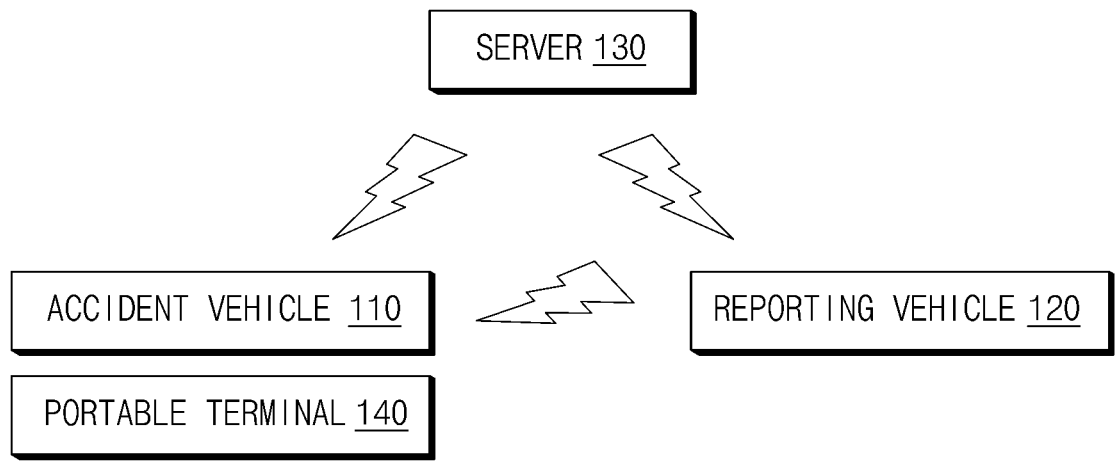
FIG. 1 is a block diagram illustrating the configuration of a system for sharing accident information according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of a system for sharing accident information according to various exemplary embodiments of the present invention.

As shown in FIG. 1, a system 100 for sharing accident information according to various exemplary embodiments of the present invention may include an accident vehicle 110, a reporting vehicle 120, a server 130, and a portable terminal 140.

The accident vehicle 110 may determine whether an accident has occurred based on information obtained from a camera and a sensor. When it is determined that the accident has occurred, the accident vehicle 110 may collect accident information and request an accident image from the server 130 to determine the cause of the accident. Furthermore, the accident vehicle 110 may receive a reporting image from the reporting vehicle 120 when there is a reporting image corresponding to an accident image. The accident vehicle 110 may determine the cause of the accident based on the reporting image received from the reporting vehicle 120. In the present case, the accident image may mean an image obtained by photographing a crash scene including an accident vehicle, and the accident information corresponds to information related to the accident image. The reporting image may correspond to an accident image and may mean an image of a crash scene photographed by a vehicle traveling around the accident vehicle.

According to various exemplary embodiments of the present invention, when the accident vehicle 110 requests an accident image from the server 130 and receives a reporting image from the reporting vehicle 120, the accident vehicle 110 may be a vehicle subscribed to an accident information sharing service.

The reporting vehicle 120 may receive a request from the server 130 to provide a reporting image corresponding to an accident image, and may transmit a reporting image corresponding to the accident image to the accident vehicle 110 or the user portable terminal 140 of the accident vehicle 110. The reporting vehicle 120 may include vehicles traveling within a specified radius from the accident vehicle 110 at the time when the accident occurs. According to various exemplary embodiments of the present invention, when the reporting vehicle 120 is requested to provide the reporting image by the server 130 or transmits the reporting image to the accident vehicle 110, the reporting vehicle 120 may be a vehicle subscribed to the accident information sharing service.

When the server 130 determines whether a request for an accident image has been received from the accident vehicle 110 and receives a request for the accident information and the accident image, the server 130 may identify the reporting vehicle 120 capable of providing the reporting image corresponding to the accident image and request the reporting vehicle 120 to transmit the reporting image obtained by the reporting vehicle 120 to the accident vehicle 110.

The portable terminal 140 may include a portable electronic device, and according to various exemplary embodiments of the present invention, may include a smartphone, a smart pad, a laptop computer, and the like. When the portable terminal 140 receives the reporting image from the reporting vehicle 120, the portable terminal 140 may be set to share the reporting image with a terminal registered as an emergency contact.

Figure 2:
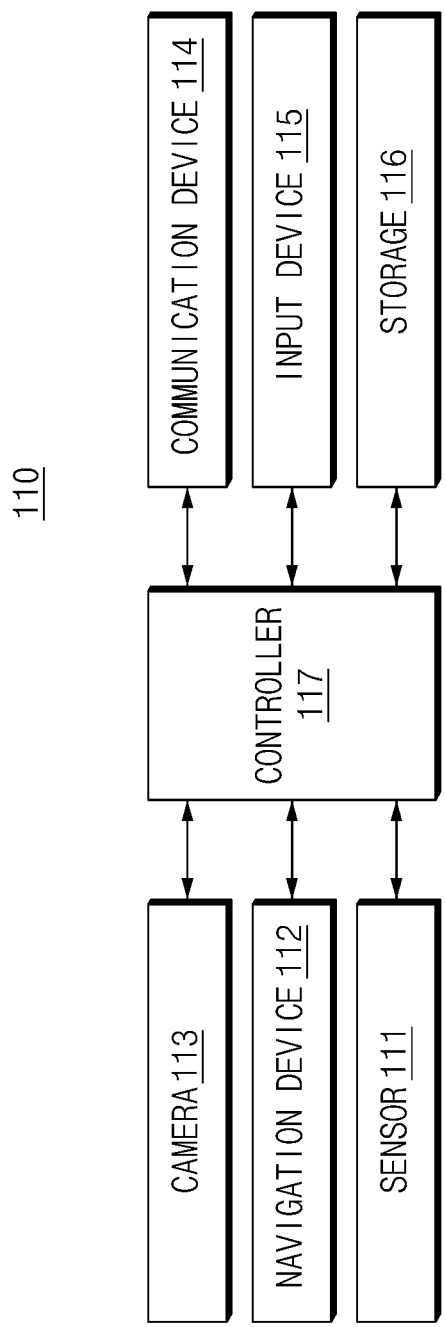
FIG. 2 is a block diagram illustrating the configuration of an accident vehicle according to various exemplary embodiments of the present invention.

FIG. 2 is a block diagram illustrating the configuration of an accident vehicle according to various exemplary embodiments of the present invention.

As shown in FIG. 2, the accident vehicle 110 according to various exemplary embodiments of the present invention may include a sensor 111, a navigation device 112, a camera 113, a communication device 114, an input device 115, storage 116, and a controller 117.

The sensor 111 may acquire driving information and surrounding information related to a vehicle. The sensor 111 may include a vehicle speed sensor, a steering angle sensor, a yaw rate sensor, a distance sensor, an image sensor, an infrared sensor, a gyro sensor, an impact detection sensor, an airbag sensor, and the like.

The navigation device 112 may include a Global Positioning System (GPS) receiving device to receive a current location of the vehicle and provide map image information related to a specific area based on the current location of the vehicle. Furthermore, the navigation device 112 may provide information related to a road on which the vehicle is located and information related to regulated speed set to the road.

The camera 113 may obtain an image around the vehicle. According to various exemplary embodiments of the present invention, the camera 133 may include front and rear cameras capable of acquiring front and rear images of the vehicle and left and right side cameras capable of photographing left and right side images of the vehicle.

The communication device 114 may communicate with the reporting vehicle 120 and the server 130. The communication device 114 may communicate in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The input device 115 may receive an input signal corresponding to a user's manipulation, operation, or voice. According to various exemplary embodiments of the present invention, the input device 115 may input accident information by a user when an accident occurs. To the present end, the input device 115 may be implemented with a scroll wheel, a button, a knob, a touch screen, a touch pad, a lever, a track ball, and the like that a user manipulates, at least one of a motion sensor for detecting motion or voice of an occupant and a voice recognition sensor, or a combination thereof.

The storage 116 may store at least one algorithm that performs operations or executions of various commands for the operation of an accident vehicle. Furthermore, the storage 116 may store a reporting image received from the reporting vehicle 120. The storage 116 may include at least one storage medium of a flash memory, a hard disk, a memory card, a read-only memory (ROM), a random access memory (RAM), and an electrically erasable programmable read-only memory (EEPROM), a programmable read-only memory (PROM), a magnetic memory, a magnetic disk, and an optical disk.

The controller 117 may be implemented with various processing devices such as a microprocessor including a semiconductor chip capable of performing operation or execution of various commands, and control the operation of an accident vehicle according to various exemplary embodiments of the present invention.

The controller 117 may determine whether an accident occurs in the accident vehicle 110 based on information obtained from the sensor 111 and the camera 113. When it is determined that an accident has occurred, the controller 117 may collect accident information. According to various exemplary embodiments of the present invention, when the airbag is deployed and it is determined that the accident has occurred, the controller 117 may automatically collect the accident information. When it is impossible to determine whether the accident occurs, the controller 117 may allow the user to input the accident information.

The controller 117 may collect accident information based on information on a part where a collision has occurred, location information related to the accident location, a search radius based on the accident location, information on a road where an accident has occurred, surrounding road information, and heading information.

First, the controller 117 may determine a vehicle collision location. The controller 117 may determine the accident occurrence location from the impact detection sensor. According to various exemplary embodiments of the present invention, the controller 117 may determine the accident occurrence location of a vehicle by dividing it into a front center, front left, front right, rear center, rear left, rear right, left direction, and right direction of the vehicle. Furthermore, the controller 117 may acquire front and rear images, acquire license plate information related to nearby vehicles based on the front and rear images, and transmit the acquired information to the server 130.

Furthermore, the controller 117 may collect location information (GPS information) of an accident occurrence location. The controller 117 may collect heading information. In the present case, the heading information may mean driving direction information related to the vehicle, and may be divided into east, west, south, north, southwest, southeast, northeast, and northwest based on the accident occurrence location.

The controller 117 may collect road information related to an accident location based on the map data of the navigation device 112. According to various exemplary embodiments of the present invention, the controller 117 may collect the number of roads adjacent to the road at the accident occurrence location, information on a type of road, and a regulated speed set for the road.

The controller 117 may determine in which direction the accident image is requested according to the according to the road type. According to various exemplary embodiments of the present invention, the controller 117 may determine the same direction as the driving direction of the accident vehicle, a direction opposite to the driving direction of the accident vehicle, and a driving direction of a road entering the accident location as the search direction thereof. When the accident location is a circular intersection, the controller 117 may request an accident image of a vehicle near the accident location without determining the search direction thereof. In the present case, the controller 117 may exclude a search direction in which the collision location is not exposed from the determined search direction thereof.

The controller 117 may collect the attributes of the road at the accident occurrence location based on the map data of the navigation device 112. According to various exemplary embodiments of the present invention, the controller 117 may calculate the average speed of the road at the accident occurrence location, and set the time of the accident image (time before and after the accident time point).

The controller 117 may calculate a search radius based on the regulated speed of the road. The controller 117 may calculate the search radius by using following Equation 1.

Search radius=(((regulated speed of a road*1000)/ 60)/60)*$td$(time of accident image)   <Equation 1>

The controller 117 may extract a search factor for acquiring information on the reporting image based on the accident information collected in the above-described manner. In the present case, the search factor may include license plate number, a vehicle type, a vehicle color, an accident occurrence location, accident occurrence time, and heading information.

Hereinafter, the operation of collecting accident information will be described in detail with reference to FIG. 3 and FIG. 4.

Figure 3:
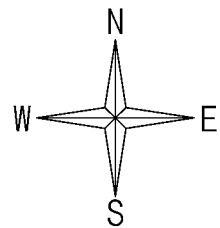
FIG. 3 and FIG. 4 are diagrams schematically showing the collection of accident information according to various exemplary embodiments of the present invention.
Figure 3:
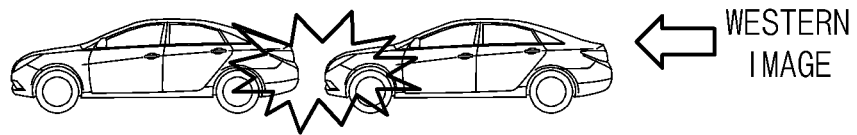
Figure 4:
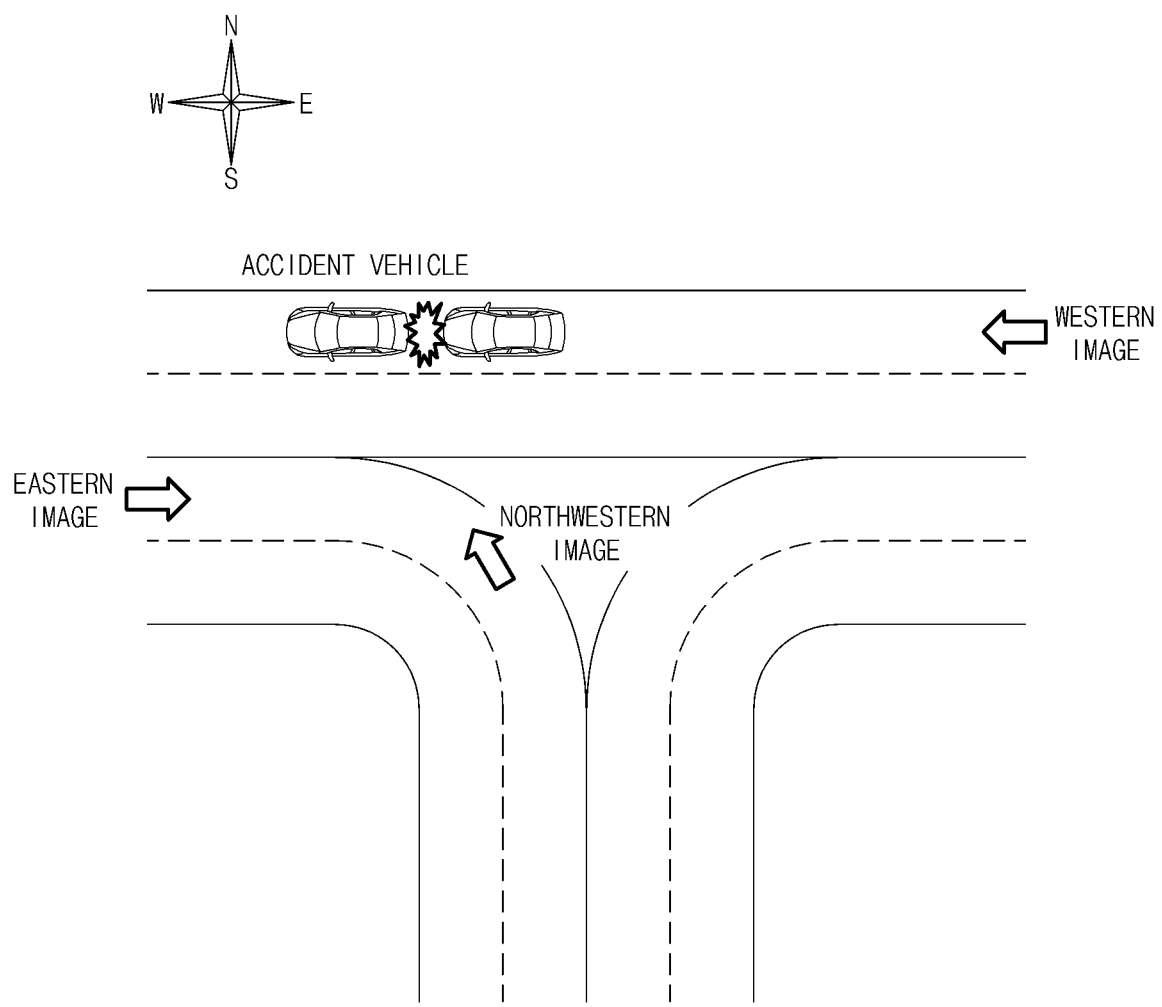

FIG. 3 and FIG. 4 are diagrams schematically showing the collection of accident information according to various exemplary embodiments of the present invention.

As shown in FIG. 3, when an accident occurs on a two-lane road, the controller 117 may determine the road information related to the accident occurrence location as the two-lane road and a regulated speed (e.g., 60 km/h) of the accident occurrence location. Based on the heading information, the controller 117 may determine the driving direction of the vehicle as a west direction, and the search direction as a west direction in which a rear image of the accident vehicle is obtained and an east direction in which a front image of the accident vehicle is obtained. Furthermore, the controller 117 may determine the collision location as the rear center portion based on the impact detection sensor. When the time of the accident image is 5 seconds, the controller 117 may set the search radius to 83.3 m by using Equation 1.

As described above, the controller 117 may collect the accident occurrence location information, the search direction (west, east), and the search radius (83 m) as accident information, and may request an accident image including the accident information from the server 130.

As shown in FIG. 4, when an accident occurs in a three-way road, the controller 117 may determine the road information related to the accident occurrence location as a three-way road and the regulated speed (e.g., 80 km/h) at the accident occurrence location. Based on the heading information, the driving direction of the vehicle may be determined as the west direction, and the search direction may be determined as the west direction in which the front image of the accident vehicle is obtained, the east direction in which the rear image of the accident vehicle is obtained, and the northwest direction in which the rear left image of the vehicle is obtained. Furthermore, the controller 117 may determine the collision location as the rear center portion based on the impact detection sensor. When the time of the accident image is 5 seconds, the controller 117 may set the search radius to 111 m by using Equation 1.

As described above, the controller 117 may collect the accident occurrence location information, the search direction (west, east, northwest), the search radius (111 m) as accident information, and may request the accident image including the accident information from the server 130.

Figure 5:
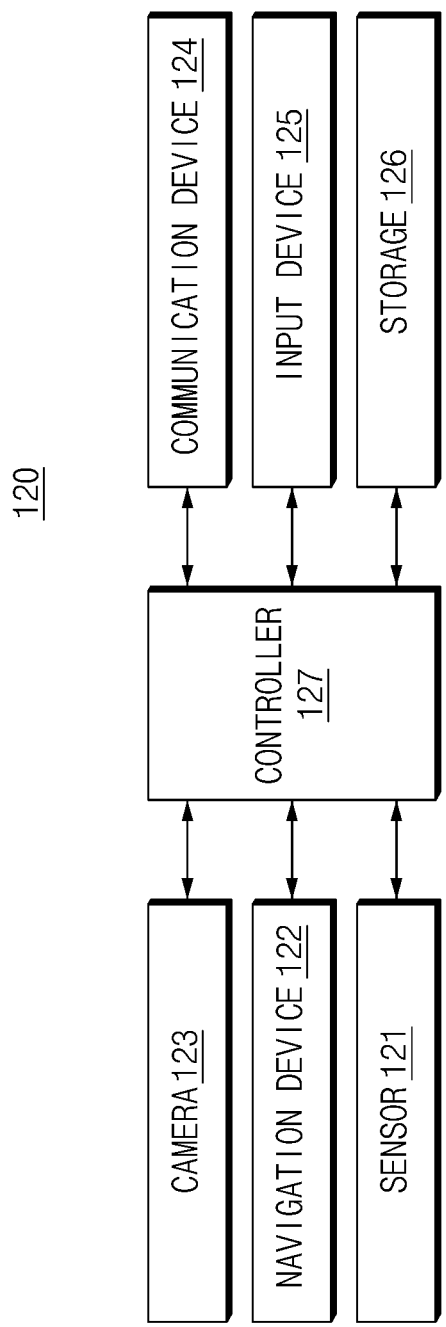
FIG. 5 is a block diagram illustrating the configuration of a reporting vehicle according to various exemplary embodiments of the present invention.

FIG. 5 is a block diagram illustrating the configuration of a reporting vehicle according to various exemplary embodiments of the present invention.

As shown in FIG. 5, the reporting vehicle 120 according to various exemplary embodiments of the present invention may include a sensor 121, a navigation device 122, a camera 123, a communication device 124, an input device 125, storage 126, and a controller 127.

The sensor 121 may acquire driving information and surrounding information related to a vehicle. The sensor 121 may include a vehicle speed sensor, a steering angle sensor, a yaw rate sensor, a distance sensor, an image sensor, an infrared sensor, a gyro sensor, an impact detection sensor, an airbag sensor, and the like.

The navigation device 122 may include a Global Positioning System (GPS) receiving device to receive a current location of the vehicle and provide map image information related to a specific area based on the current location of the vehicle. Furthermore, the navigation device 122 may provide information related to a road on which the vehicle is located and information related to a regulated speed set to the road.

The camera 123 may obtain an image around the vehicle. According to various exemplary embodiments of the present invention, the camera 123 may include front and rear cameras capable of acquiring front and rear images of the vehicle and left and right side cameras capable of photographing left and right side images of the vehicle.

The communication device 124 may communicate with the accident vehicle 110 and the server 130. The communication device 124 may communicate in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The input device 125 may receive an input signal corresponding to a user's manipulation, operation, or voice. According to various exemplary embodiments of the present invention, the input device 125 may input accident information by a user when an accident occurs.

The storage 126 may store at least one algorithm that performs operations or executions of various commands for the operation of a reporting vehicle. Furthermore, the storage 126 may store a reporting image obtained from a camera.

The controller 127 may be implemented with various processing devices such as a microprocessor including a semiconductor chip capable of performing operation or execution of various commands, and control the operation of a reporting vehicle according to various exemplary embodiments of the present invention.

When obtaining the reporting image, the controller 127 may extract the image at the time of the accident, analyze the image, and extract a search factor.

Furthermore, the controller 127 may transmit the search factor to the server 130. The controller 127 may receive information on an accident vehicle from the server 130 and transmit the reporting image to the accident vehicle or a user portable terminal of the accident vehicle.

When the controller 127 receives a request for the reporting image corresponding to the accident image from the server 130, the controller 127 may search for the reporting image corresponding to the accident image among the images stored in the storage 126. The controller 127 may determine whether the location information at the time of the accident is located within a specified radius of the reporting vehicle. When it is determined that the heading information related to the accident vehicle is matched with the heading information related to the reporting vehicle, the controller 127 may determine that a reporting image corresponding to the accident image has been found, and transmit the found reporting image to the accident vehicle 110.

The controller 127 may store the reporting image as Tag 1 and provide the reporting image to the server 130 even when the reporting image corresponding to the accident image is not requested from the server 130. When there is no accident vehicle requesting the reporting image provided to the server 130, the controller 127 may store the reporting image as Tag 2 assigned by the server 130. This is for the purpose of providing the reporting image when the accident vehicle requests the reporting image in future.

Figure 6:
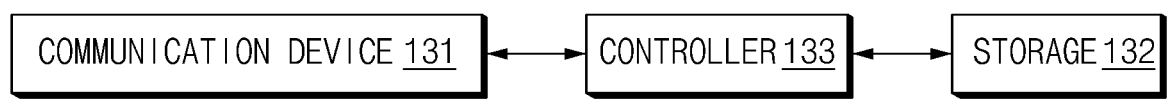
FIG. 6 is a block diagram illustrating the configuration of a server according to various exemplary embodiments of the present invention.

FIG. 6 is a block diagram illustrating the configuration of a server according to various exemplary embodiments of the present invention.

As shown in FIG. 6, the server 130 may include a communication device 131, storage 132, and a controller 133.

The communication device 131 may communicate with the accident vehicle 110 and the reporting vehicle 120. The communication device 131 may communicate in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 132 may store at least one algorithm that performs operations or executions of various commands for the operation of a server. Furthermore, the storage 132 may store a history of requesting an accident image by the accident vehicle 110, and may store a history of providing a reporting image by the reporting vehicle 120. Furthermore, information (e.g., a vehicle modem, a user phone number, or app ID) about a vehicle subscribed to an accident information sharing service, that is, shared member information (member vehicle information) may be stored.

The controller 133 may be implemented with various processing devices such as a microprocessor including a semiconductor chip capable of performing operation or execution of various commands, and control the operation of a server according to various exemplary embodiments of the present invention.

According to various exemplary embodiments of the present invention, when the controller 133 receives a request for accident information (a search factor) and an accident image from the accident vehicle 110, the controller 133 may determine whether a reporting vehicle capable of providing a reporting image corresponding to the received information exists. According to various exemplary embodiments of the present invention, when the controller 133 receives the license plate information related to a vehicle as the search factor from the accident vehicle 110, the controller 133 may search for the vehicle having the license plate information based on the sharing member information. When the vehicle having the license plate information received from the accident vehicle 110 is searched, the controller 133 may request a reporting image from the found vehicle and transmit information related to the accident vehicle. Meanwhile, when there has no the license plate information received from the accident vehicle 110, the controller 133 may request the reporting image from an unspecified vehicle that has subscribed to the accident information sharing service based on the accident information (e.g., a Global Positioning System (GPS) location, heading information, a search direction thereof, a search radius, and the like) received from the accident vehicle 110.

According to another exemplary embodiment of the present invention, when the controller 133 receives a request for accident information (search factor) and an accident image from the accident vehicle 110, the controller 133 may determine whether a reporting image matching the requested accident image based on the accident information exists. The controller 133 may determine whether there is the reporting image matching the requested accident image based on the history of providing the reporting image previously stored in the storage 132. When it is determined that there is a reporting image matching the accident image, the controller 133 may identify the information related to the reporting vehicle based on the sharing member information, and transmit the information related to the accident vehicle to the reporting vehicle whose information is identified. Meanwhile, when it is determined that there is no reporting image matching the accident image, the controller 133 may store the image request history and request a search for the accident image from a vehicle (a number of unspecified vehicles) subscribed to the accident information sharing service. When there is no reporting image matching the accident image, the controller 133 may store the image request history such that the reporting image is transmitted to the accident vehicle when the reporting vehicle provides the reporting image in future.

According to various exemplary embodiments of the present invention, the controller 133 may store the history of providing a reporting image when receiving accident information (reporting image) input by the user from the reporting vehicle 120. As an example, the controller 133 may store a reporting vehicle providing a reporting image, a search factor, and a tag number generated in the vehicle.

The controller 133 may determine whether there is an accident vehicle requesting an accident image corresponding to the reporting image based on the accident information received from the reporting vehicle 120. When it is determined that there is an accident vehicle requesting an accident image, the controller 133 may identify the information related to the accident vehicle based on the sharing member information, and transmit the information related to the accident vehicle to the reporting vehicle. Meanwhile, when it is determined that there is no accident vehicle requesting a reporting image, the controller 133 may store the reporting image provided from the reporting vehicle 120 as tag 2, and transmit, to the reporting vehicle 120, the fact that there is no accident vehicle requesting the reporting image.

Figure 7:
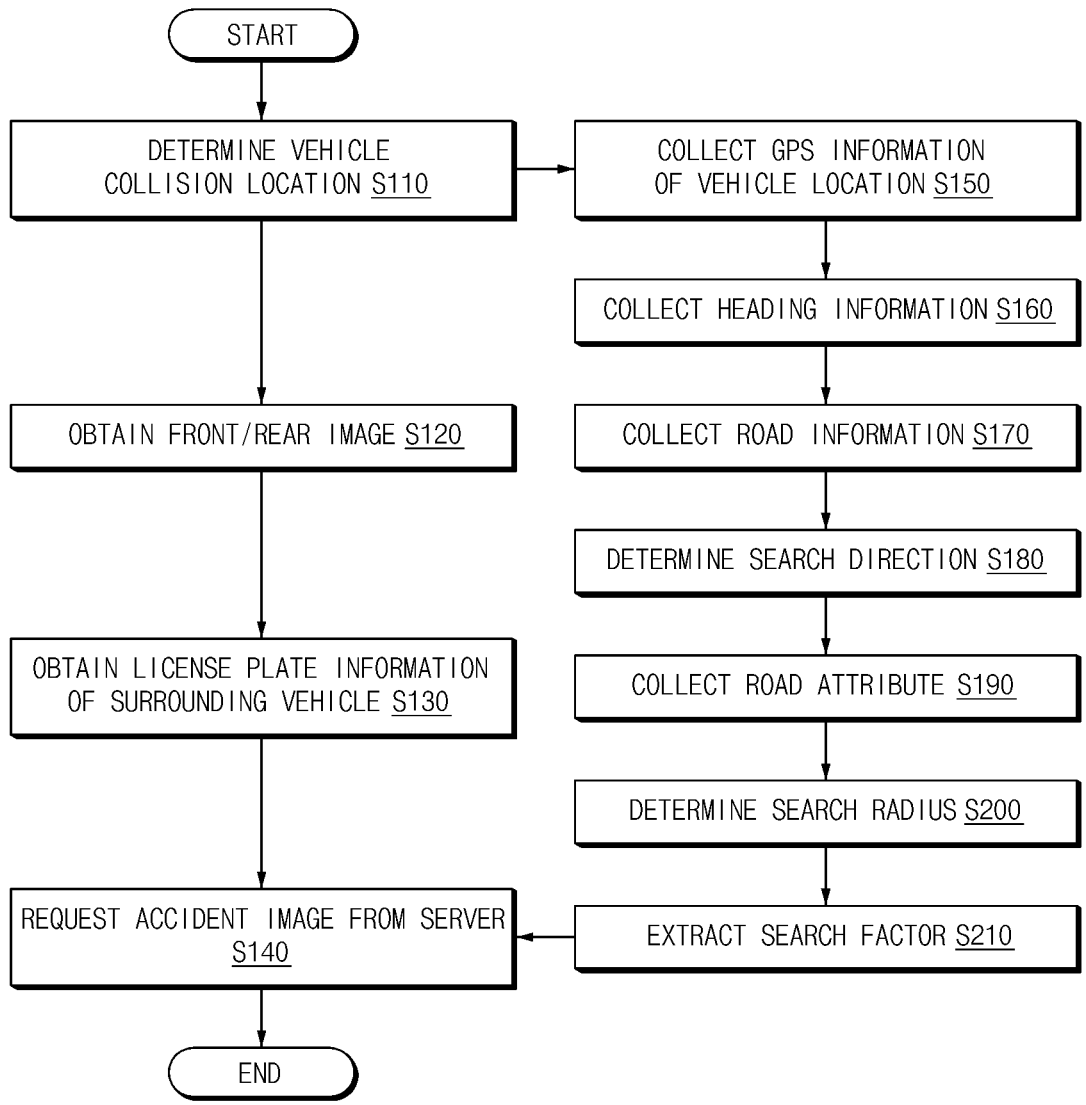
FIG. 7 is a flowchart illustrating a method of collecting accident information related to an accident vehicle according to various exemplary embodiments of the present invention.

FIG. 7 is a flowchart illustrating a method of collecting accident information related to an accident vehicle according to various exemplary embodiments of the present invention.

As shown in FIG. 7, in S110, the controller 117 of the accident vehicle 110 may determine the vehicle collision position. In S110, the controller 117 may determine the accident occurrence location from the impact detection sensor. According to various exemplary embodiments of the present invention, the controller 117 may determine the accident occurrence location of a vehicle by dividing the accident occurrence location into a front center, front left, front right, rear center, rear left, rear right, left direction thereof, and right direction of the vehicle.

Furthermore, the controller 117 may acquire front and rear images in S120, and acquire license plate information related to nearby vehicles based on the front and rear images in S130. Furthermore, the controller 117 may transmit the acquired information to the server 130 in S140.

Furthermore, the controller 117 may collect location information (GPS information) of the accident occurrence location in S150. The controller 117 may collect heading information in S160. In the present case, the heading information may mean driving direction information related to the vehicle, and may be divided into east, west, south, north, southwest, southeast, northeast, and northwest based on the accident occurrence location.

In S170, the controller 117 may collect the road information related to the accident location based on the map data of the navigation device 112. According to various exemplary embodiments of the present invention, the controller 117 may collect the number of roads adjacent to the road at the accident occurrence location, type information related to the road, and a regulated speed set to the road.

In S180, the controller 117 may determine which direction to request the accident image corresponding to the road type. That is, the controller 117 may determine the search direction. According to various exemplary embodiments of the present invention, the controller 117 may determine the same direction as the driving direction of the accident vehicle, the direction opposite to the driving direction of the accident vehicle, and the driving direction of a road entering the accident location as the search direction thereof. When the accident location is a circular intersection, the controller 117 may request an accident image of a vehicle near the accident occurrence location without determining the search direction. In the present case, the controller 117 may exclude the search direction in which the collision location is not exposed from the determined search direction thereof.

In S190, the controller 117 may collect the attributes of the road at the accident occurrence location based on the map data of the navigation device 112. According to various exemplary embodiments of the present invention, the controller 117 may calculate the average speed of the road at the accident occurrence location, and set the time of the accident image (time before and after the accident time point).

In S200, the controller 117 may calculate a search radius based on the regulated speed of the road. The controller 117 may calculate the search radius by using Equation 1. In S210, the controller 117 may extract the search factor for acquiring the information related to the reporting image based on the accident information collected in S150 to S200. In the present case, the search factor may include license plate number, a vehicle type, a vehicle color, an accident occurrence location, accident occurrence time, and heading information.

Figure 8:
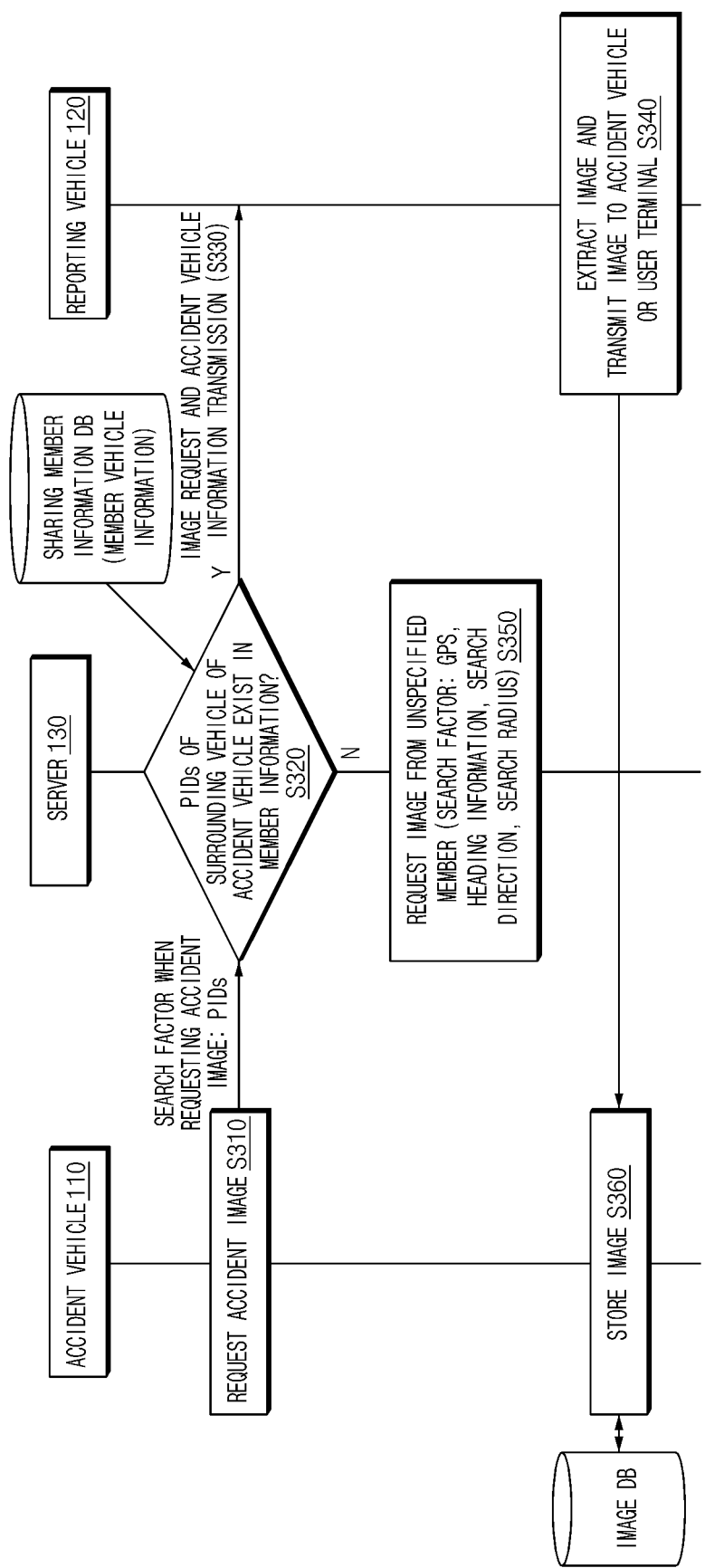
FIG. 8 is a flowchart illustrating a method of sharing accident information according to various exemplary embodiments of the present invention.

FIG. 8 is a flowchart illustrating a method of sharing accident information according to various exemplary embodiments of the present invention.

As shown in FIG. 8, the accident vehicle 110 may request an accident image from the server 130 in S310. According to various exemplary embodiments of the present invention, when the accident image is requested from the server 130, a search factor may be set to license plate information (PIDs) of a vehicle.

When receiving a request for an accident image from the accident vehicle 110, in S320, the server 130 may determine whether the license plate information related to a surrounding vehicle of the accident vehicle exists in member information based on the sharing member information database. When it is determined in S320 that the license plate information related to the surrounding vehicle of the accident vehicle is in the member information (Y), in S330, the server 130 may request the reporting image to the vehicle (reporting vehicle) having the license plate information, and may transmit the information related to the accident vehicle. Meanwhile, when it is determined in S320 that the license plate information related to the surrounding vehicle of the accident vehicle is not in the member information (N), in S350, the server 130 may request the reporting image to a vehicle (unspecified member) subscribed to the accident information service based on the search factor (GPS information, heading information, search direction, search radius).

When the reporting vehicle 120 receives the request for the reporting image and the accident vehicle information from the server 130, in S340, the reporting vehicle 120 may extract an image corresponding to the accident image among the images acquired by the reporting vehicle 120, and transmit the reporting image corresponding to the accident image to the accident vehicle 110 or the user portable terminal of the accident vehicle.

When receiving the reporting image from the reporting vehicle 120, the accident vehicle 110 may store the image in S360.

Figure 9:
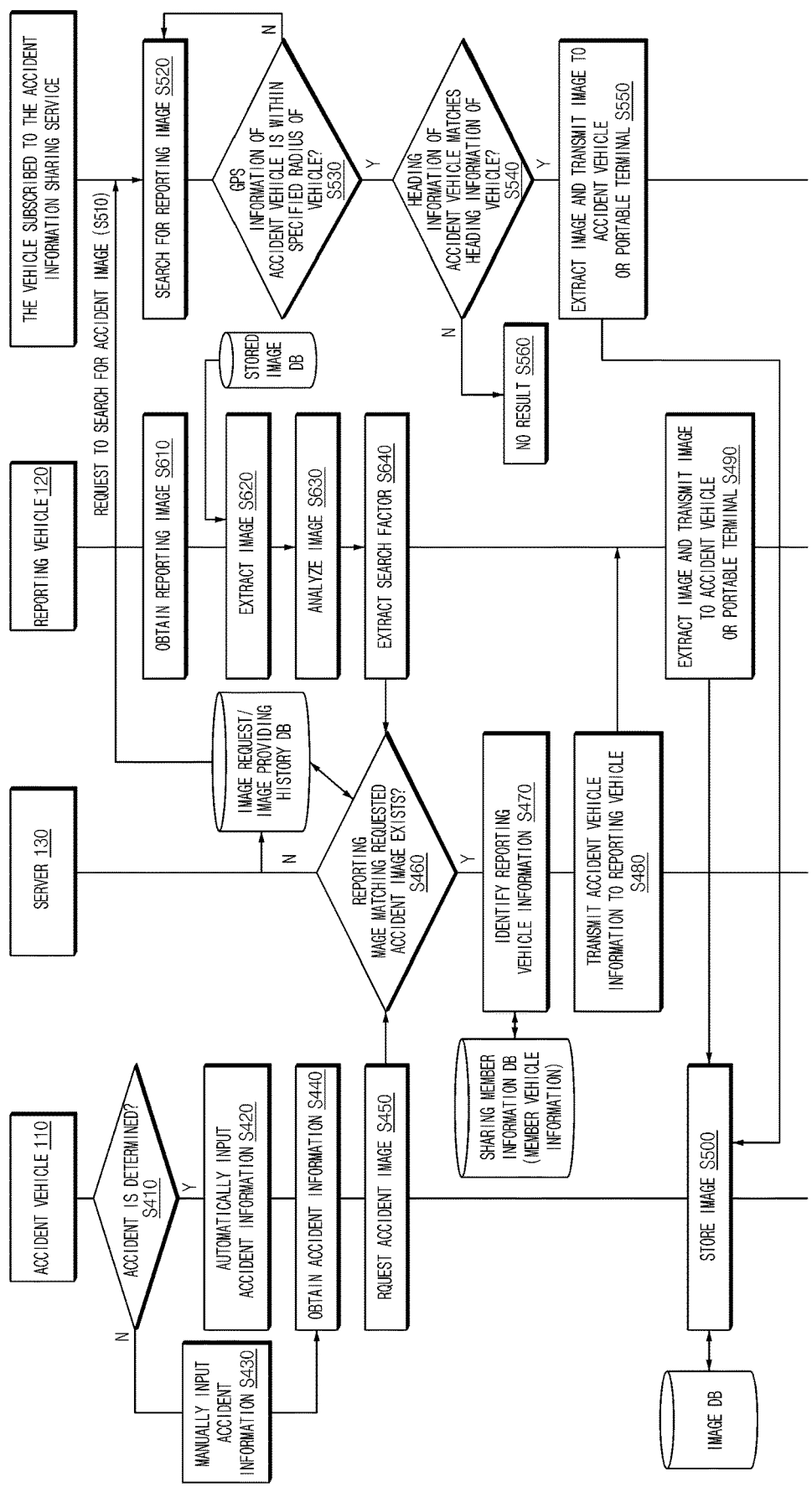
FIG. 9 is a flowchart illustrating a method of sharing accident information according to various exemplary embodiments of the present invention.

FIG. 9 is a flowchart illustrating a method of sharing accident information according to various exemplary embodiments of the present invention.

As shown in FIG. 9, in S410, the accident vehicle 110 may determine whether an accident occurs therein based on the information obtained from the sensor 111 and the camera 113. When the airbag is deployed so that it is determined in S410 that an accident has occurred (Y), the accident vehicle 110 may automatically collect accident information in S420. Meanwhile, when the accident vehicle 110 cannot determine the occurrence of the accident (N), the accident information may be input by the user in S430.

In S440, the accident vehicle 110 may collect accident information based on information on a portion where a collision has occurred, location information related to the accident occurrence location, a search radius based on the accident occurrence location, information on a road where the accident has occurred, surrounding road information, and heading information.

Furthermore, the accident vehicle 110 may request the accident information and the accident image from the server 130 in S450.

In S460, the server 130 may determine whether there is a reporting image matching the accident image requested by the accident vehicle 110. When it is determined in S460 that there is a reporting image matching the accident image (Y), the server 130 may identify the information related to the reporting vehicle based on the sharing member information in S470, and in S480, may transmit the information related to the accident vehicle to the reporting vehicle whose information is identified. Meanwhile, when it is determined in S460 that there is no reporting image matching the accident image (N), the server 130 may request a search for the accident image from the vehicle subscribed to the accident information sharing service in S510.

The reporting vehicle 120 may acquire the reporting image in S610, and store the reporting image in the storage (storing DB). The reporting vehicle 120 may extract an image at the time of an accident from the reported images in S620 and may analyze the image to extract a search factor in S630 and S640. When receiving the information related to the accident vehicle from the server 130, in S490, the reporting vehicle 120 may transmit the image extracted in S620 to the accident vehicle or the user portable terminal of the accident vehicle.

Meanwhile, the vehicle, which subscribes to the accident information sharing service and receives the search request for the accident image from the server 130, searches for the reporting image corresponding to the accident image in S520, determines whether the accident vehicle is located within a specified radius of a host vehicle based on the GPS information related to the accident vehicle in S530, and determines whether the heading information related to the accident vehicle matches the heading information related to the host vehicle in S540 when it is determined that the accident vehicle is located within the specified radius of the host vehicle based on the GPS information related to the accident vehicle.

When it is determined in S540 that the heading information related to the accident vehicle matches the heading information related to the host vehicle match (Y), in S550, the vehicle subscribed to the accident information sharing service may extract the image at the accident time point from the reporting images, and transmit the extracted image to the accident vehicle or the user portable terminal of the accident vehicle. Meanwhile, when it is determined in S540 that the heading information related to the accident vehicle does not match the heading information related to the host vehicle, the vehicle subscribed to the accident information sharing service may end with no result in S560.

In S500, the accident vehicle may store the reporting image received from the reporting vehicle 120 or the vehicle subscribed to the accident information sharing service.

Figure 10:
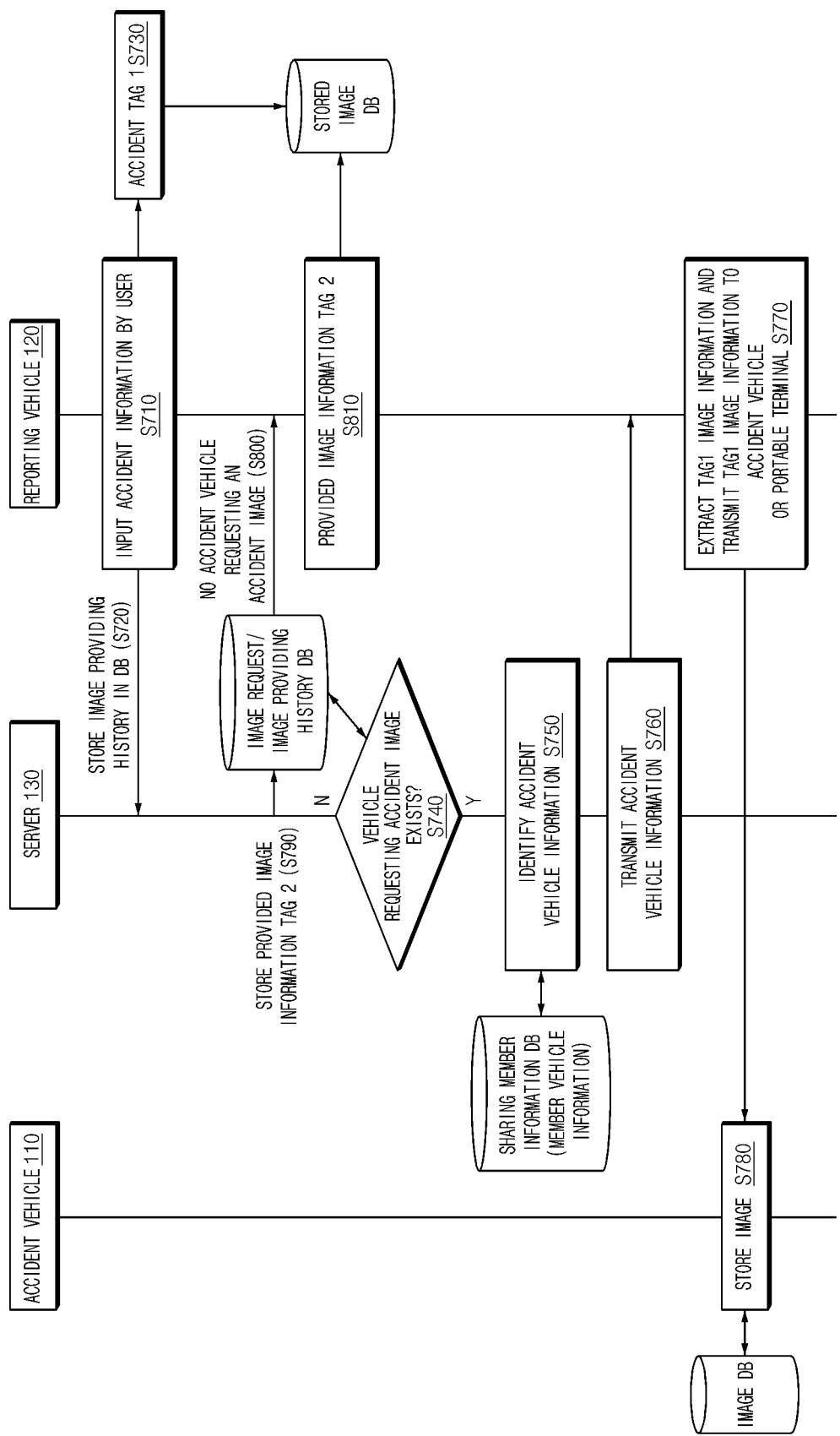
FIG. 10 is a flowchart illustrating a method of sharing accident information according to various exemplary embodiments of the present invention.

FIG. 10 is a flowchart illustrating a method of sharing accident information according to various exemplary embodiments of the present invention.

As shown in FIG. 10, in S710, the user of the reporting vehicle 120 may input accident information. The present time point may be before the server 130 receives a request for an accident image from the accident vehicle. When the accident information (reporting image) is input by the user, in S730, the reporting vehicle 120 may store the accident information and the reporting image as Tag 1. Furthermore, the reporting vehicle 120 may transmit the reporting image (information related to the reporting image) to the server 130 in S720. The server 130 may store the reporting image (information related to the reporting image) received in S720. For example, the server 130 may store the reporting vehicle providing the reporting image, a search factor, and a tag number generated in the vehicle.

The server 130 may determine whether there is an accident vehicle requesting an accident image corresponding to the report image based on the report image (the report image is information) received from the reporting vehicle 120 (S740). When it is determined in S740 that there is an accident vehicle requesting an accident image corresponding to the reporting image (Y), the server 130 may identify the accident vehicle information based on the sharing member information in S750 and may transmit the accident vehicle information to the reporting vehicle 120 in S760.

Meanwhile, in S740, when it is determined in S740 that there is no accident vehicle requesting an accident image corresponding to the reporting image (N), the server 130 may store the reporting image provided from the reporting vehicle 120 as Tag 2 in S790 and may transmit to the reporting vehicle 120 that there is no accident vehicle requesting an accident image corresponding to the reporting image in S800.

When the reporting vehicle 120 receives that there is no accident vehicle requesting the accident image from the server 130, in S810, the reporting vehicle 120 may store the reporting image (information related to the reporting image) transmitted in S720 as Tag 2. Furthermore, when the information related to the accident vehicle is received in S760, the reporting vehicle 120 may extract the reporting image stored as tag 1 and transmit the reporting image to the accident vehicle 110 and the user portable terminal of the accident vehicle in S780.

Figure 11:
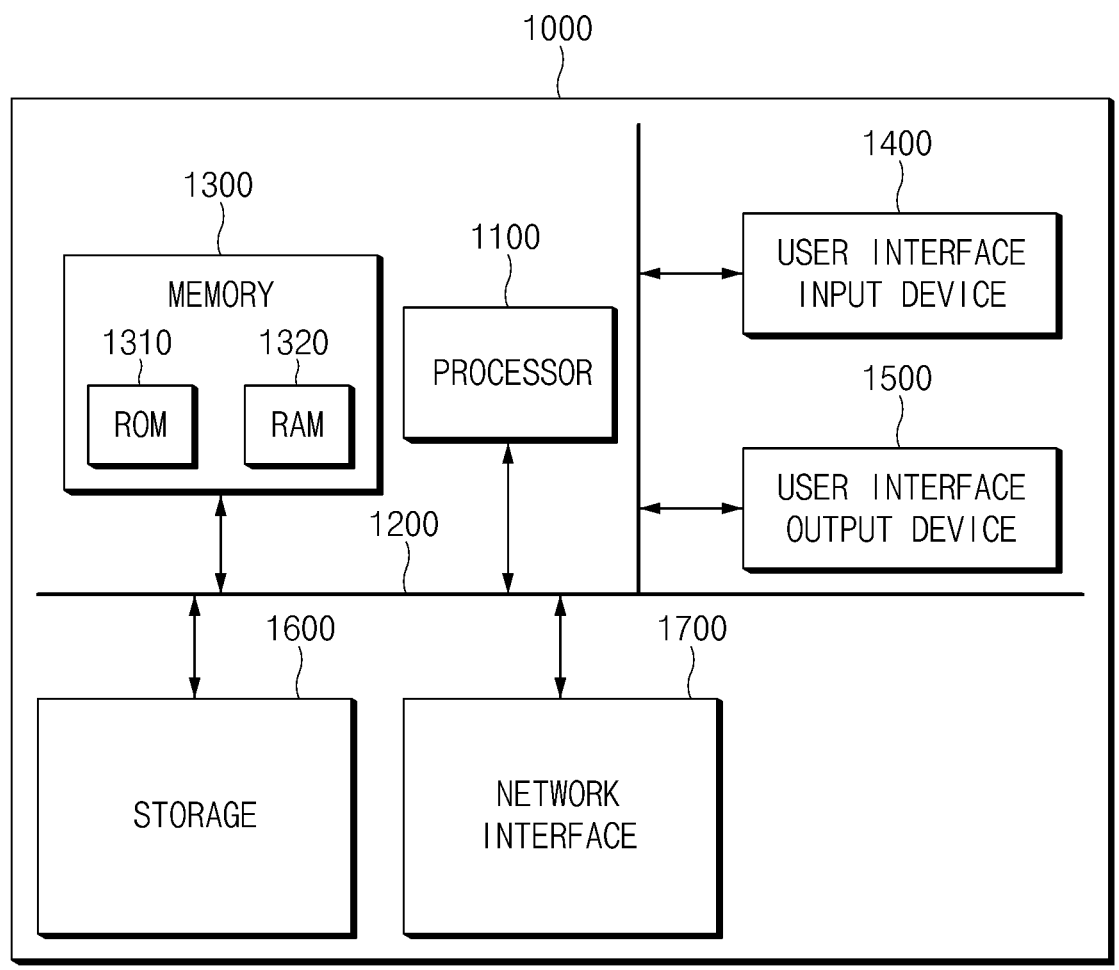
FIG. 11 is a view illustrating a computing system for executing a method according to various exemplary embodiments of the present invention.

FIG. 11 is a view illustrating a computing system for executing a method according to various exemplary embodiments of the present invention.

Referring to FIG. 6, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the According to the system for sharing accident information and method of the present invention, when a vehicle accident occurs, it is possible to more accurately determine the cause of the accident by sharing the surrounding image with vehicles driving around the accident vehicle. Furthermore, according to the according to the system for sharing accident information and method of the present invention, it is possible to transmit a surrounding image to not only the accident vehicle but also a portable terminal of an accident vehicle occupant so that the surrounding image may be shared with the family.

The above description is a simple exemplification of the technical spirit of the present invention, and the present invention may be variously corrected and modified by those skilled in the art to which various exemplary embodiments of the present invention pertains without departing from the essential features of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for sharing accident information related to a vehicle, the system comprising:
    an accident vehicle configured to collect the accident information and to request an accident image including the accident information; and
    a server configured to determine whether the accident image and a request for the accident image are received from the accident vehicle, to identify a reporting vehicle configured for providing a reporting image corresponding to the accident information and the accident image upon determining that the accident information and the request for the accident image are received, and to request the reporting vehicle to transmit the reporting image acquired by the reporting vehicle to the accident vehicle,
    wherein the server is configured to request the reporting image corresponding to the accident image from a vehicle subscribed to an accident information sharing service upon determining that information related to the reporting vehicle is not identified.

2. The system of claim 1, wherein the accident vehicle is configured to collect the accident information including location information related to an accident occurrence point, a search radius based on the accident occurrence point, information related to a road where an accident occurs, and neighboring road information, and heading information.

3. The system of claim 1, wherein the accident vehicle is configured to extract a search factor for acquiring information related to the reporting image based on the accident information.

4. The system of claim 3, wherein the search factor includes a license plate number, a vehicle type, a vehicle color, an accident occurrence location, accident occurrence time, and heading information.

5. The system of claim 4, wherein the server is configured to store a history of providing the reporting image upon determining that the reporting image is provided from the reporting vehicle.

6. The system of claim 5, wherein the server is configured to determine whether information related to the reporting vehicle is identified based on the search factor or the history of providing the reporting image.

7. The system of claim 1, wherein the server is configured to transmit information related to the accident vehicle to the reporting vehicle upon determining that information related to the reporting vehicle is identified.

8. The system of claim 1, wherein the server is configured to store information related to the reporting image provided from the reporting vehicle and is configured to determine whether an accident vehicle requesting the accident image exists while the accident information and the request for the accident image are not received from the accident vehicle.

9. The system of claim 8, wherein the server is configured to identify information related to the accident vehicle and to transmit the information related to the accident vehicle to the reporting vehicle upon determining that the accident vehicle requesting the accident image exists.

10. The system of claim 8, wherein the server is configured to notify the reporting vehicle that any vehicles requesting the accident image do not exist and to request the reporting vehicle to store the accident image upon determining that any accident vehicles requesting the accident image do not exist.

11. The system of claim 1, wherein the reporting vehicle is configured to transmit the reporting image to the accident vehicle or a user portable terminal of the accident vehicle upon receiving information related to the accident vehicle from the server.

12. The system of claim 11, wherein the reporting vehicle is configured to extract a search factor upon acquiring the reporting image.

13. A method of sharing accident information, the method comprising:
    collecting, by an accident vehicle, accident information and requesting, by the accident vehicle, an accident image including the accident information from a server;
    determining, by the server, whether the accident information and the request for the accident image are received, and identifying, by the server, a reporting vehicle configured for providing a reporting image corresponding to the accident information and the accident image upon determining that the accident information and the request for the accident image are received;
    requesting, by the server, the reporting vehicle to transmit the reporting image obtained by the reporting vehicle to the accident vehicle; and requesting, by the server, the reporting image corresponding to the accident image from a vehicle subscribed to an accident information sharing service upon determining that information related to the reporting vehicle is not identified.

14. The method of claim 13, further including:
transmitting, by the server, information related to the accident vehicle to the reporting vehicle upon determining that the information related to the reporting vehicle is identified.

15. The method of claim 13, further including:
storing, by the server, information related to the reporting image provided from the reporting vehicle and determining, by the server, whether an accident vehicle requesting the accident image exists while the accident information and the request for the accident image are not received from the accident vehicle.

16. The method of claim 15, wherein the server is configured to identify information related to the accident vehicle and to transmit the information related to the accident vehicle to the reporting vehicle upon determining that the accident vehicle requesting the accident image exists.

17. The method of claim 15, further including:
notifying, by the server, the reporting vehicle that any vehicles requesting the accident image do not exist, and requesting, by the server, the reporting vehicle to store the reporting image upon determining that any vehicles requesting the accident image do not exist.

18. The method of claim 13, further including:
transmitting, by the reporting vehicle, the reporting image to the accident vehicle or a user portable terminal of the accident vehicle upon determining that information related to the accident vehicle is received from the server.

* * * * *